United States Patent
Armbruster et al.

(10) Patent No.: US 9,891,688 B2
(45) Date of Patent: Feb. 13, 2018

(54) METHOD FOR OPERATING AT LEAST TWO DATA PROCESSING UNITS WITH HIGH AVAILABILITY, IN PARTICULAR IN A VEHICLE, AND DEVICE FOR OPERATING A MACHINE

(71) Applicant: SIEMENS AKTIENGESELLSCHAFT, München (DE)

(72) Inventors: Michael Armbruster, München (DE); Marcus Fehling, München (DE); Ludger Fiege, Grafing (DE); Gunter Freitag, München (DE); Cornel Klein, Oberhaching (DE)

(73) Assignee: SIEMENS AKTIENGESELLSCHAFT (DE)

( * ) Notice: Subject to any disclaimer, the term of this patent is extended or adjusted under 35 U.S.C. 154(b) by 213 days.

(21) Appl. No.: 14/373,441

(22) PCT Filed: Dec. 10, 2012

(86) PCT No.: PCT/EP2012/074920
§ 371 (c)(1),
(2) Date: Oct. 9, 2014

(87) PCT Pub. No.: WO2013/110394
PCT Pub. Date: Aug. 1, 2013

(65) Prior Publication Data
US 2015/0033054 A1 Jan. 29, 2015

(30) Foreign Application Priority Data
Jan. 27, 2012 (DE) .................. 10 2012 201 185

(51) Int. Cl.
*G06F 11/00* (2006.01)
*G06F 1/32* (2006.01)
(Continued)

(52) U.S. Cl.
CPC ....... *G06F 1/3234* (2013.01); *B60W 50/0098* (2013.01); *B60W 50/023* (2013.01);
(Continued)

(58) Field of Classification Search
CPC ............. G06F 11/1608; G06F 11/1629; G06F 11/1633; G06F 11/1654; G06F 11/2038;
(Continued)

(56) References Cited

U.S. PATENT DOCUMENTS 5,491,486 A * 2/1996 Welles, II ................ G01S 1/04
342/357.74
6,208,923 B1 3/2001 Hommel
(Continued)

FOREIGN PATENT DOCUMENTS

CN 101523685 A 9/2009
CN 102307377 A 1/2012
(Continued)

OTHER PUBLICATIONS

Elnozahy, et al., "Energy-Efficient Duplex and TMR Real-Time Systems", Dec. 2002, IEEE Real-Time Systems Symposium.*
(Continued)

*Primary Examiner* — Gabriel Chu
(74) *Attorney, Agent, or Firm* — Schmeiser Olsen & Watts LLP

(57) ABSTRACT

A method for operating at least two data processing units with high availability, in particular in a vehicle, is provided. A first data processing unit and a second data processing unit can each provide the same function to an extent of at least 60 percent or at least 90 percent. The second data processing unit removes automatically at least one entry for a process to be executed from a memory unit or automatically places itself into a standby mode.

15 Claims, 6 Drawing Sheets

(51) Int. Cl.
  *G06F 11/20* (2006.01)
  *B60W 50/00* (2006.01)
  *B60W 50/023* (2012.01)
  *H04L 29/08* (2006.01)

(52) U.S. Cl.
  CPC ........ *G06F 1/3287* (2013.01); *G06F 11/2038* (2013.01); *H04L 67/12* (2013.01); *Y02B 60/1282* (2013.01)

(58) Field of Classification Search
  CPC ............. G06F 11/3013; G06F 11/3062; G06F 1/3212; G06F 1/32; G06F 1/3203; G06F 1/3206; G06F 1/3234; G06F 1/3243; G06F 1/3246; G06F 1/3287; G06F 1/3293; G06F 2212/1028; B60L 11/1851; B60L 11/1861; B60L 15/2045; B60W 10/24; B60W 40/00; B60W 50/02; B60W 50/023; Y02B 60/1214; Y02B 60/14
  See application file for complete search history.

(56) References Cited

U.S. PATENT DOCUMENTS

| | | | |
|---|---|---|---|
| 6,351,823 B1 | 2/2002 | Mayer et al. | |
| 6,434,712 B1* | 8/2002 | Urban | G06F 11/181 714/10 |
| 7,630,807 B2 | 12/2009 | Yoshimura et al. | |
| 7,979,746 B2 | 7/2011 | Cornelius et al. | |
| 8,148,924 B2 | 4/2012 | Ohkuwa et al. | |
| 8,645,022 B2 | 2/2014 | Yoshimura et al. | |
| 8,872,646 B2* | 10/2014 | Kahn | G01P 13/00 340/457 |
| 2003/0084359 A1* | 5/2003 | Bresniker | G06F 1/3203 713/324 |
| 2004/0107273 A1* | 6/2004 | Biran | H04L 67/1002 709/223 |
| 2006/0015231 A1 | 1/2006 | Yoshimura et al. | |
| 2006/0119508 A1* | 6/2006 | Miller | G01S 19/34 342/357.77 |
| 2006/0212677 A1* | 9/2006 | Fossum | G06F 1/3237 712/1 |
| 2007/0079067 A1* | 4/2007 | Ranganathan | G06F 11/2082 711/114 |
| 2007/0268108 A1* | 11/2007 | Weinberg | G06F 1/3203 340/3.1 |
| 2009/0006876 A1* | 1/2009 | Fukatani | G06F 3/0625 713/320 |
| 2009/0011791 A1 | 1/2009 | Tashiro | |
| 2009/0327780 A1* | 12/2009 | Dawkins | G06F 1/3221 713/323 |
| 2010/0004793 A1 | 1/2010 | Ohkuwa et al. | |
| 2010/0030421 A1 | 2/2010 | Yoshimura et al. | |
| 2010/0332059 A1* | 12/2010 | Lee | B62K 23/04 701/22 |
| 2011/0084648 A1* | 4/2011 | Cao | H01M 10/44 320/103 |
| 2011/0191015 A1* | 8/2011 | Rychlak | G01C 21/3469 701/532 |
| 2011/0230309 A1* | 9/2011 | Albrecht | F02N 11/0822 477/183 |
| 2012/0137172 A1* | 5/2012 | Gardelegen | G06F 1/3206 714/14 |
| 2013/0039481 A1* | 2/2013 | Garaschenko | H04M 3/24 379/102.04 |
| 2013/0181899 A1* | 7/2013 | Yun | G06F 1/3203 345/158 |
| 2014/0189305 A1* | 7/2014 | Hickmann | G06F 11/14 712/205 |
| 2015/0100207 A1 | 4/2015 | Yoshimura et al. | |

FOREIGN PATENT DOCUMENTS

| | | | |
|---|---|---|---|
| CN | 202159378 U | * | 3/2012 |
| DE | 19749068 A1 | | 5/1999 |
| DE | 19834870 A1 | | 2/2000 |
| JP | 2000053012 A | | 2/2000 |
| JP | 2005512218 A | | 4/2005 |
| JP | 2005526473 A | | 9/2005 |
| JP | 2007125950 A | | 5/2007 |
| JP | 2008518296 A | | 5/2008 |
| JP | 2008137472 A | | 6/2008 |
| JP | 2008269487 A | | 11/2008 |
| JP | 2011203967 A | | 10/2011 |
| JP | 2012218621 A | | 11/2012 |
| WO | WO2011003813 A1 | * | 1/2011 ............. H04L 12/12 |

OTHER PUBLICATIONS

Baleani, M. u.a.: Fault-Tolerant Platforms for Automotive Safety-Critical Applications. In: Proceedings of the 2003 international conference on Compilers, architecture and synthesis for embedded systems. 2003, S. 170-177, ISBN: 1-58113-676-5.
International Search Report: PCT/EP2012/074920; International File dated Dec. 10, 2012; Siemens Aktiengesellschaft; 2 pgs.
Chinese Application No. 201280071847.8, Office Action dated Mar. 21, 2016. 4 pages.
Chinese language Office Action and its English translation for Chinese Application No. 201280071847.8, dated May 4, 2017.

* cited by examiner

FIG 4

|  | VCC1 | | VCC2 | |
|---|---|---|---|---|
|  | Pr1 | Pr2 | Pr3 | Pr4 |
| Steering F1 | X | X | X ~120 | X ~122 |
| ACC F2 | X | X | X | X |
| Charging F3 | X | X | | |
| ESP F4 | X | X | X | X |
| Engine F5 | X | X | | |
| UMTS F6 | X | | | |

Z4: Traveling F1 4x, F2 4x or 2x, F4 4x, F5 2x, F6 1x

Z5: Stopping F1 2x, F2 2x, F4 2x, F5 2x, F6 1x

Z6: Charging F3 2x

METHOD FOR OPERATING AT LEAST TWO DATA PROCESSING UNITS WITH HIGH AVAILABILITY, IN PARTICULAR IN A VEHICLE, AND DEVICE FOR OPERATING A MACHINE

CROSS-REFERENCE TO RELATED APPLICATIONS

This application claims priority to PCT Application No. PCT/EP2012/074920, having a filing date of Dec. 10, 2012, based off of DE 102012201185.4 having a filing date of Jan. 27, 2012, the entire contents of which are hereby incorporated by reference.

FIELD OF TECHNOLOGY

The following relates to a method for operating at least two data processing units, DP units in brief, with high availability, in particular in a vehicle. A first DP unit and a second DP unit can provide in each case at least the same function or the same functions to at least 10 percent. The DP units provide typically in each case the same functions to at least 60 percent or to at least 90 percent referred to, for example, the machine code of the first DP unit. Both units execute, for example, the same steps. In the case of a fault, the automatic control of the machine, e.g. of a car, is switched off, for example, with a transition to the manual control or switch-over to fall-back methods in which, for example, only one of the two DP units works. In addition, the following relates to an associated device for operating a machine.

BACKGROUND

From U.S. Pat. No. 7,979,746 B2, dual-dual "lockstep" processors are known which are redundant in pairs with respect to one another and wherein there are also two mutually redundant processors within one pair. From DE 197 49 068 A1, a method for monitoring a computer system consisting of at least two processors is known, the processors carrying out different functions from one another.

SUMMARY

An aspect relates to a method which, in spite of the presence of high redundancy, i.e. availability, operates energy-efficiently. In addition, a corresponding device is to be specified.

The aspect related to the method is achieved by a method having the method steps specified in claim 1. Further developments are specified in the subclaims.

In the method, the second data processing unit can remove automatically at least one entry for a process to be executed from a memory unit or automatically place itself into a standby mode. The decision about the switching-off of the redundancy is thus made internally in the second data processing unit, unit in brief In this case, the second unit is lower-ranking than the first unit with respect to redundancy. If the decision about the switching-off of the redundancy is wrong, this is absorbed by the overall concept of redundancy and error tolerance according to which an error can occur in one of the two units.

In particular, the switching-off of the redundancy is thus not initiated from the outside, e.g. by the first unit. If the decision about the switching-off were to be wrong in this case, the incorrect decision would also propagate beyond the first unit to the second DP unit which contradicts a basic concept of the error tolerance.

In the first DP unit, too, at least one entry for a process to be executed can be removed automatically by the first DP unit from a memory unit or the first DP unit can place itself automatically into a standby mode in which context the first DP unit would then be lower-ranking with respect to the redundancy, e.g. a slave unit in a master/slave relation of the two DP units.

In both units, the same machine code can be stored which results in a redundancy of 100 percent.

In the method, it involves not both units being switched off but only one of the two units. The switching-off occurs preferably also not on the basis of an error of the second unit since this is still fully operatable, but for other reasons. Such a reasoning is, for example, the reduction of power consumption. A low power consumption is particularly important for an electric vehicle or a hybrid vehicle having an electric motor and internal-combustion engine in the drive unit in order to increase the range of the electromotive propulsion. But in a vehicle which only contains an internal-combustion engine in the drive unit, too, a reduction of the power consumption can lead to a reduction of fuel consumption. The switching-off occurs, for example, by switching off the power supply to the unit or by isolating the unit from its power supply. As an alternative, the processors of the unit can also be switched off The same occurs with the removal of the entry for the process to be executed. The entry is removed although the process could be executed faultlessly. Removing the entry leads to the process now only being executed by the first unit. The second unit no longer executes the process which reduces the computing power needed. If a multiplicity of processes are not executed in this manner, e.g. more than 10 or even more than 100, the computing power needed can be reduced considerably which has an effect on the necessary power consumption of a processor of the second unit. Process monitoring of the second unit, after removal of the entries for a sufficient number of processes, can even lead to the result that the processor of the second unit or the second unit, respectively, can be switched off completely or placed into a standby mode. As an alternative, there can be a number of standby modes with in each case reduced energy consumption in comparison with the preceding standby mode.

The energy consumption of a processor can be within a range of from 15 to 50 watt. If, for example, a processor is switched off for a total of one hour, 50 watt hours are saved. The existing energy is thus utilized efficiently.

The entries are removed, for example, by changing the data value of a memory cell, for example, of a data item, which specifies whether the relevant process is to be executed or not.

Removal of the entries or placing into the standby mode can occur in dependence on the operating state of a machine for the operation of which the DP units are used, particularly a transport machine.

The transport machine can be a vehicle, e.g. an electric vehicle, a hybrid vehicle or a vehicle which is driven only by an internal-combustion engine. Vehicles of any size are considered, i.e. utility vehicles, particularly trucks, buses, passenger vehicles, motorcycles, bicycles, etc. However, the transport machine can also be an aircraft, boat or ship.

The operating state can be detected in a simple manner with the aid of at least one sensor unit, especially a motion sensor, a speed sensor or a tachometer. The sensor unit operates, for example, mechanically and/or electronically.

The operating state can be the state "stopping", "charging of a battery", the state "traveling" or another operating state. The "traveling" state can be divided, in particular, into at least two substates, e.g. into the travel at low speed, travel at medium speed and travel at high speed states. The upper limit for the low speed is, for example, within a range of 3 km/h (kilometers per hour) up to 10 km/h. The lower limit for the high speed is, for example, within a range of from 50 km/h to 80 km/h or even up to 100 km/h.

The safety requirements, for example, for the protection of passengers or persons and thus for the reliability of technical systems differ considerably within these ranges. The reliability of electronic facilities demanded in each case can be taken into consideration by using these ranges in a simple manner even when switching off redundancy.

The data processing units can be operated on a data transmission network using a data transmission protocol which enables processors or network units/transmission units to be switched on, especially on an Ethernet.

In the case of an Ethernet, there is the possibility, for example, of a "Wake on LAN" (Local Area Network), by means of which the second unit can be switched on again in a simple manner after the switching-off. After the switching-on of the second unit, a booting process starts automatically, for example, for loading a BIOS (Basic Input Operation System) from a read-only memory into a fast main memory followed by loading central parts of an operating system into the fast main memory or into another fast main memory.

As an alternative, however, a power supply can also be switched on or added again by circuitry, for example via a relay or via a transistor, in a different manner than via the data transmission network or the data transmission networks.

The switching-on can occur in dependence on a detected operating state of the machine, for example a change in speed of a transport machine, particularly for the passenger transportation including a driver.

In contrast to the switching-off, the switching-on can be controlled from the outside, i.e. by another unit than the second unit because an incorrect decision during the switching-on leads to the redundancy being increased by switching on the second unit. The second unit would then switch itself off again, for example.

The entry removed can be entered again automatically by the second data processing unit, for example in dependence on the current operating state of the machine. This can be done by the second DP unit when the second DP unit has not yet been switched off completely or after a switching-off and subsequent switching-on of the second DP unit. In both cases, the entries removed have been stored temporarily at another location, for example, in order to facilitate the re-entering.

The standby mode can be a state in which the power supply of the second data processing unit is switched off or in which the second data processing unit is isolated from its power supply. During the switching-on, the second DP unit then boots again which, however, can take place within, for example, less than 50 ms (milliseconds) or within a period of less than 100 ms.

The standby mode can be ended by the first data processing unit, particularly by initiating the switching-on of a power supply of the second data processing unit or by initiating the connecting of the power supply of the second DP unit to the second DP unit, e.g. a central power supply.

The power supply is effected, for example, by using a separate switched-mode power supply and/or a circuit for voltage stabilization.

Each data processing unit can contain in each case at least two processors. These processors can also be components of separate sub-data processing units, subunits in brief The two processors can provide the same functions in order to generate redundancy within the first unit or the second unit, respectively. The aim is to achieve a high error self detection per DP unit. For example, the machine code in a memory of the subunits matches at 100%, at least 90% or at least 60%. The processors of the subunits of a data processing unit mutually check their processing results, for example. It is only when the results match that the data belonging to these results will be processed further in another DP unit.

Thus, there is a total of at least four redundant processors, which is currently considered to be adequate for control functions with respect to the safety of persons. Further processors can be provided in the data processing units for reasons of computing capacity.

The two data processing units can be connected in each case to two identically constructed data transmission links or data processing networks. Thus, high availability and high protection against transmission errors can be ensured also in the case of the data transmission.

For example, the data can be transmitted via two different paths, for example via two bus systems or via two network levels, preferably along different directions of transmission, for example in a ring topology.

The data transmission can be wire-connected, fiber-connected or wireless. The data transmission can be synchronous or asynchronous. In particular, messages which are provided in data transmission protocols, e.g., Ethernet protocol according to IEEE (Institute of Electrical and Electronics Engineers Inc.) 802.3, TCP/IP (Transmission Control Protocol)/(Internet Protocol) according to RFCs (Request for Comment) of the IETF (Internet Engineering Task Force), are used in the data transmission.

But the bus systems normally used in the automobile industry are also used, e.g.:
dual CAN bus (Controller Area Network),
TTP (Time Triggered Protocol),
TTE (Time Triggered Ethernet),
PROFINET (PROcess FIeld NETwork), possibly with IRT (Isochronous Real Time), or
FlexRay-Bus.

Furthermore, proprietary protocols are used.

The two data processing units can provide at least one core function for controlling the machine. Core functions are, for example:
specification of steering angles,
specification of braking commands,
automatic distance control,
control of an electric drive motor, for example by using field-oriented control.

The core functions can be provided at a central point in the machine or in the vehicle, respectively. But a distributed embodiment of the core functions is also possible, or an embodiment at another location, respectively.

As an alternative, the two data processing units can provide functions in at least one peripheral subsystem of the machine. Peripheral subsystems are, for example, actuators, e.g.:
implementation of a steering angle data item into a steering movement, wherein steering is actuated automatically,
automatic operation of a brake,
automatic drive of a internal-combustion engine, for example actuation of a valve or of a throttle flap,
automatic drive of an electric motor for propulsion.

The object related to the device is achieved by the device explained in the text which follows. Further developments are specified in the subclaims.

The device for operating a machine contains:
- a first data processing unit and
- a second data processing unit, the first data processing unit and the second data processing unit in each case providing at least the same function or the same functions to an extent of at least 10%. Typically, the same functions are provided to an extent of at least 60% or to an extent of at least 90% or even to an extent of 100%, and
- a first control unit in the second data processing unit, wherein the first control unit removes at least one entry for a process to be executed from a memory unit or places the second data processing unit automatically into a standby mode.

The technical effects mentioned above for the method apply. By switching off redundancy, energy can in turn be utilized efficiently. The first unit, too, can contain a corresponding control unit for switching off redundancy.

The device can contain a first memory unit in the first data processing unit, it being entered in the memory unit that the first data processing unit is higher-ranking than the second data processing unit with respect to providing functions or with respect to the redundancy.

In the second unit, too, there can be a memory unit in which it is entered then that the second DP unit is lower-ranking than the first unit. Thus, the master/slave principle can be utilized here.

The device can contain the following technical facilities:
- first data transmission link, DT link in brief, or first data processing network, and
- second data transmission link or second data transmission network.

The first data processing unit and the second data processing unit can be connected to the first DP link and to the second DP link, wherein at least 60% of the data to be transmitted or at least 90% of the data to be transmitted or even all data to be transmitted are transmitted via both data transmission links or via both data transmission networks.

Thus, the data transmission is also redundant and thus highly available. In particular, data transmission protocols according to the above-mentioned standards or de facto standards are used, in particular also proprietary protocols.

The characteristics, features and advantages of the aspects described above, and the manner in which these are achieved will become clearer and more distinctly comprehensible in conjunction with the following description of the exemplary embodiments. As far as the term "can" is used in this application, this means both the technical possibility and the actual technical implementation.

BRIEF DESCRIPTION

Some of the embodiments will be described in detail, with reference to the following figures, wherein like designations denote like members, wherein:

FIG. 4 shows process tables in which processes to be executed are entered;

DETAILED DESCRIPTION

Figure 1:
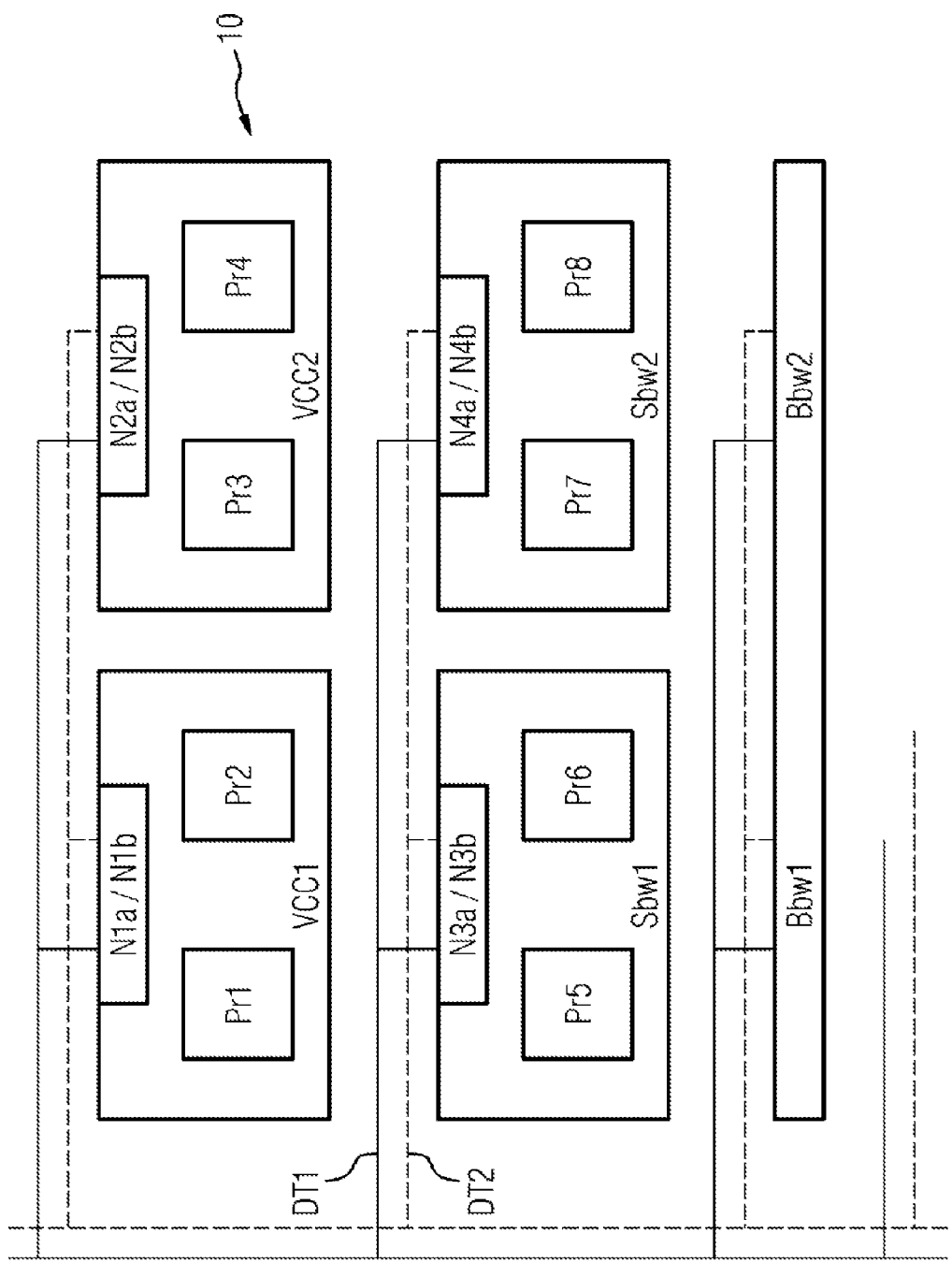
FIG. 1 shows central and peripheral computers in a vehicle.

A redundancy switch-off in standby of vehicles is explained. As an alternative, the redundancy switch-off can also be executed in an aircraft or in another machine.

When safety-critical components in vehicles such as, e.g., steering or braking are no longer driven mechanically or hydraulically, i.e. driving is executed, for example, electrically, there must be a redundant path which, in the case of a fault, e.g. in a CPU (Central Processing Unit), power line, communication line, RAM (Random Access Memory), computing process/function etc., can take over control. If this fall-back level should also not be a mechanical fall-back level, the electrical drive itself must be designed to be redundant. This means that the electrical lines must be doubled and the calculations for the control functions or regulating functions should be configured doubled and on a number of computing cores in order to discover random errors in the cores themselves.

In the case of a duo-duplex structure, this means that apart from multi-channel lines, four processor cores are used. For this reason, a high energy demand is necessary here, i.e. up to four times compared with the energy consumption without redundant drive. However, the redundancy is not needed in all situations. However, the systems in the vehicle cannot be switched off completely. For example, systems must be active when the vehicle is parked. However, this is not safety-critical. Instead, it is important in standby that as little energy as possible is consumed so that the vehicle does not need to be operated even over a prolonged period (e.g. during parking). The same applies to triplex structures.

Until now, no purely electrical drive of safety-critical systems is yet used serially in a central architecture in the automobile sector. X-by-wire solutions can be constructed, for example, only for individual subsystems. In this context, the entire subsystem can then be switched off during parking.

In the case of a central E/E architecture (electro/electronic architecture) of a vehicle, the components are then designed in such a manner that they are capable of operating in a duo-duplex or triplex architecture. However, they can be woken by a non-redundant wakeup call. In standby, only the necessary functions are executed and all the others are not calculated. The redundant computer cores are switched off if the remaining active functions do not need redundancy. The calculations and the necessary communication are now only single-channeled. If the redundancy is needed again, the cores are automatically booted and synchronized: communication is multi-channeled again. The subsystems and functions which are still not needed continue to remain inactive and are not operated redundantly.

The E/E architecture does not need to be designed to be redundant also for the safety-critical systems for every state of a vehicle. For particular states, e.g. parking, it is possible to dispense with redundancy and for other states, redundancy is needed only in subsystems. If no redundancy is needed, the energy requirement is lowered.

Standby modes for central control units such as redundant computer cores are provided for without further devices or subsystems having to be installed especially for this mode. Standby times are increased. The period up to which the battery must be charged again is extended.

If the system can start up the components which are necessary for redundancy independently, the vehicle can execute safety-critical functions even without direct supervision by the user (e.g. remote-controlled charging and/or discharging processes).

One embodiment can also be the use of n>2 duplex systems: n duplex computers (with n times 2 cores each per duplex unit), where n is a natural number.

FIG. 1 shows central and peripheral computers in a vehicle, particularly in a battery-operated vehicle, electric car. The vehicle contains a central on-board computer 10 and further computing units.

The central on-board computer 10 contains:
a first central control unit VCC1, and
a second central control unit VCC2.

The further computing units include:
a first steering control unit Sbw1 (Steer-by-wire),
a second steering control unit Sbw2,
a first brake control unit Bbw1 (Brake-by-wire),
a second braking control unit Bbw2, and
other units, not shown, which are designed to be redundant or single.

Furthermore, there is a first data transmission network DT1 and a second data transmission network DT2 which connect the on-board computer 10 and the further computing units.

The first central control unit VCC1 contains:
a processor Pr1 and a processor Pr2, for example microprocessors which process program commands which are stored in memory units, not shown,
two transmission units N1a, N1b, with the aid of which a connection is established from and to the processors Pr1 and Pr2 to the data transmission networks DT1, DT2.

When using an Ethernet, the transmission units N1a, N1b are formed, for example, by two so-called switches which will be explained in greater detail below with reference to FIG. 6. However, other networks can also be used which, in particular, use the protocols mentioned in the introduction.

The second central control unit VCC2 contains:
a processor Pr3 and a processor Pr4, for example microprocessors which process program commands which are stored in memory units, not shown,
two transmission units N2a, N2b, with the aid of which a connection is established from and to the processors Pr3 and Pr4 to the data transmission networks DT1, DT2. The transmission units N2a, N2b are arranged, for example, like the transmission unit N1a, N1b.

The first central control unit VCC1 and the second central control unit VCC2 provide, for example, at least one or all of the following functions redundantly:
central functions for the steering, outputting, for example, a steering angle to be set,
central functions for driving at a distance, generating, for example, acceleration or braking data,
central functions for an automatic braking process, e.g. as part of an ABS (Anti Blocking System),
central functions of an antislip control (ASR),
central functions of a stabilization process ESP (electronic stabilization program),
control of an electric motor which is used as drive for an electric vehicle,
central parts of an electronic braking force distribution (EBD).

The first steering control unit Sbw1 contains:
a processor Pr5 and a processor Pr6, for example microprocessors which process program commands which are stored in memory units, not shown,
two transmission units N3a, N3b, with the aid of which a connection is established from and to the processors Pry and Pr6 to the data transmission networks DT1, DT2.

The second steering control unit Sbw2 contains:
a first processor Pr7 and a second processor Pr8, for example microprocessors which process program commands which are stored in memory units, not shown,
two transmission units N4a, N4b, with the aid of which a connection is established from and to the processors Pr7 and Pr8 to the data transmission networks DT1, DT2.

The first steering control unit Sbw1 and the second steering control unit Sbw2 provide the following functions redundantly:
converting received data for a steering angle into a steering movement of the vehicle.

The first braking control unit Bbw1 contains:
two processors, not shown, particularly microprocessors,
two transmission units, not shown, for coupling the processors of the first braking control unit Bbw1 to the data transmission networks DT1, DT2.

The second braking control unit Bbw2 contains:
two processors, not shown, particularly microprocessors,
two transmission units, not shown, for coupling the processors of the second braking control unit Bbw2 to the data transmission networks DT1, DT2.

The first braking control unit Bbw1 and the second braking control unit Bbw2 provide the following functions redundantly:
operating a brake in dependence on central inputs from the control units VCC1 and VCC2, respectively, in the case of a failure of VCC1,
decentralized functions as part of an ABS braking process, and
decentralized functions as part of an ESP process.

The data transmission networks DT1, DT2 provide for a redundant transmission of data between the units shown in FIG. 1. The data transmission networks DT1, DT2 operate in accordance with the same transmission protocol, for example Flex-Ray, dual CAN bus or Ethernet as is explained in greater detail below by means of FIG. 6.

Figure 2:
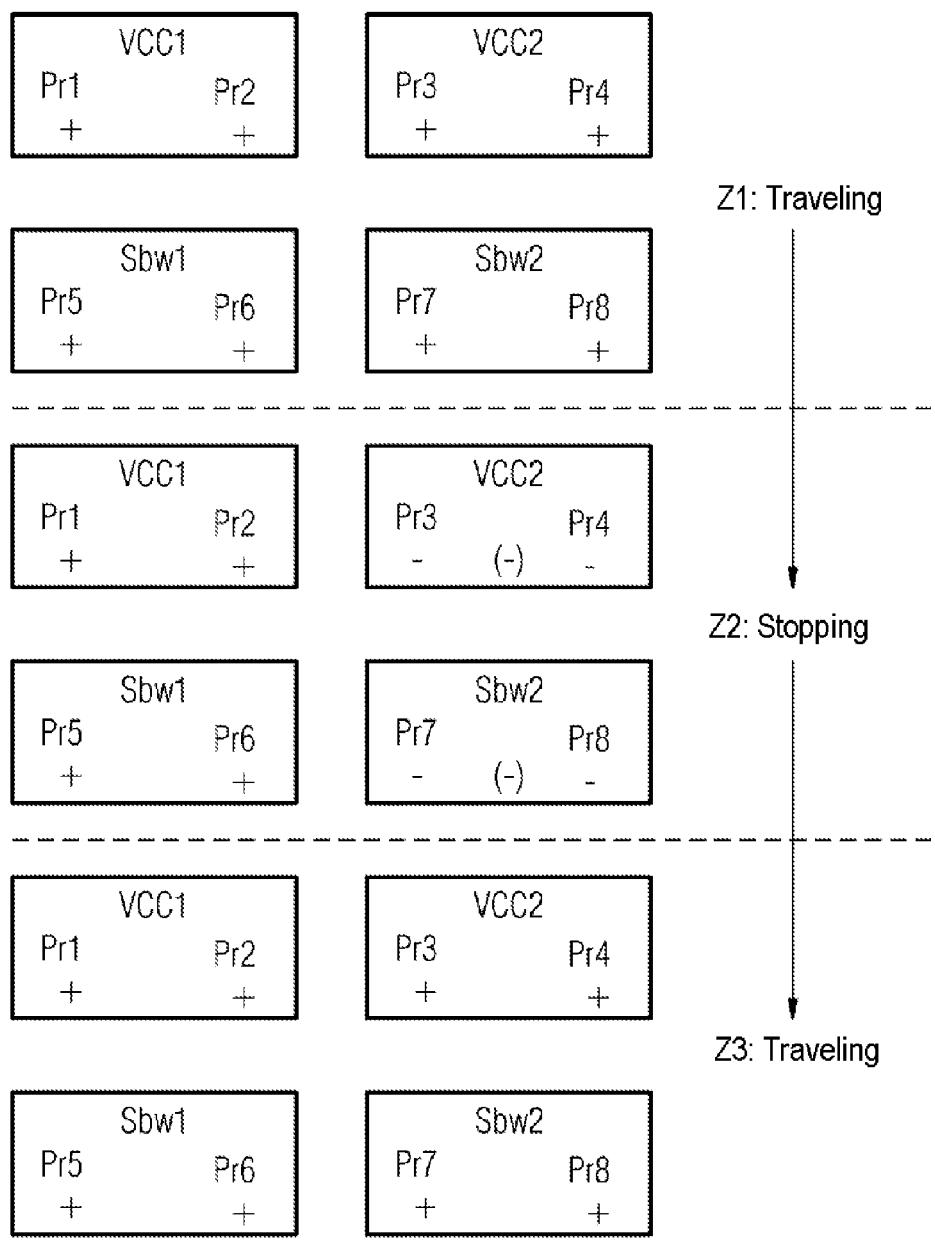
FIG. 2 shows the switching-on and switching-off of computers in the vehicle in dependence on various operating states.

FIG. 2 shows the switching-on and switching-off of computers in the vehicle or on-board network 10 in dependence on various operating states.

An operating state Z1 relates to the traveling of the vehicle, e.g. at medium speed (e.g. within a range of from 30 km/h up to 60 km/h). An operating state Z2 relates to the stopping of the vehicle, e.g. at a traffic signal. The operating state Z2 follows the operating state Z1. If the traffic signal switches to green, operating state Z2 is followed by an operating state Z3, in which the vehicle travels again at medium speed.

In operating state Z1, the following switching states exist:
first central control unit VCC1: processor Pr1 switched on, briefly on, processor Pr2 on,
second central control unit VCC2: processor Pr3 on, processor Pr4 on,
first steering control unit Sbw1: processor Pr5 on, processor Pr6 on, and
second steering control unit Sbw2: processor Pr7 on, processor Pr8 on.

In operating state Z2, the following switching states exist:
first central control unit VCC1: processor Pr1 switched on, briefly on, processor Pr2 on,
second central control unit VCC2: processor Pr3 switched off, briefly off, processor Pr4 off,
first steering control unit Sbw1: processor Pr5 on, processor Pr6 on, and
second steering control unit Sbw2: processor Pr7 off, processor Pr8 off In operating state Z3, the switching states mentioned in operating state Z1 exist again.

In operating state Z2, the redundancy is thus reduced in order to use energy efficiently in a state uncritical for the safety of persons. At least one system remains activated, however, in this case the first central control unit VCC1 or the first steering control unit Sbw1, respectively.

As an alternative, the central control units VCC1 and VCC2, the steering control units Sbw1 and Sbw2 and the braking control units Bbw1 and Bbw2 can also be driven as a complete unit with respect to the switching-on and switching-off, in contrast to processor-related switching-on and switching-off. The switching-on and switching-off takes place, for example, by switching power supply units on or off or by isolating power supply units or by connecting to power supply units.

Figure 3:
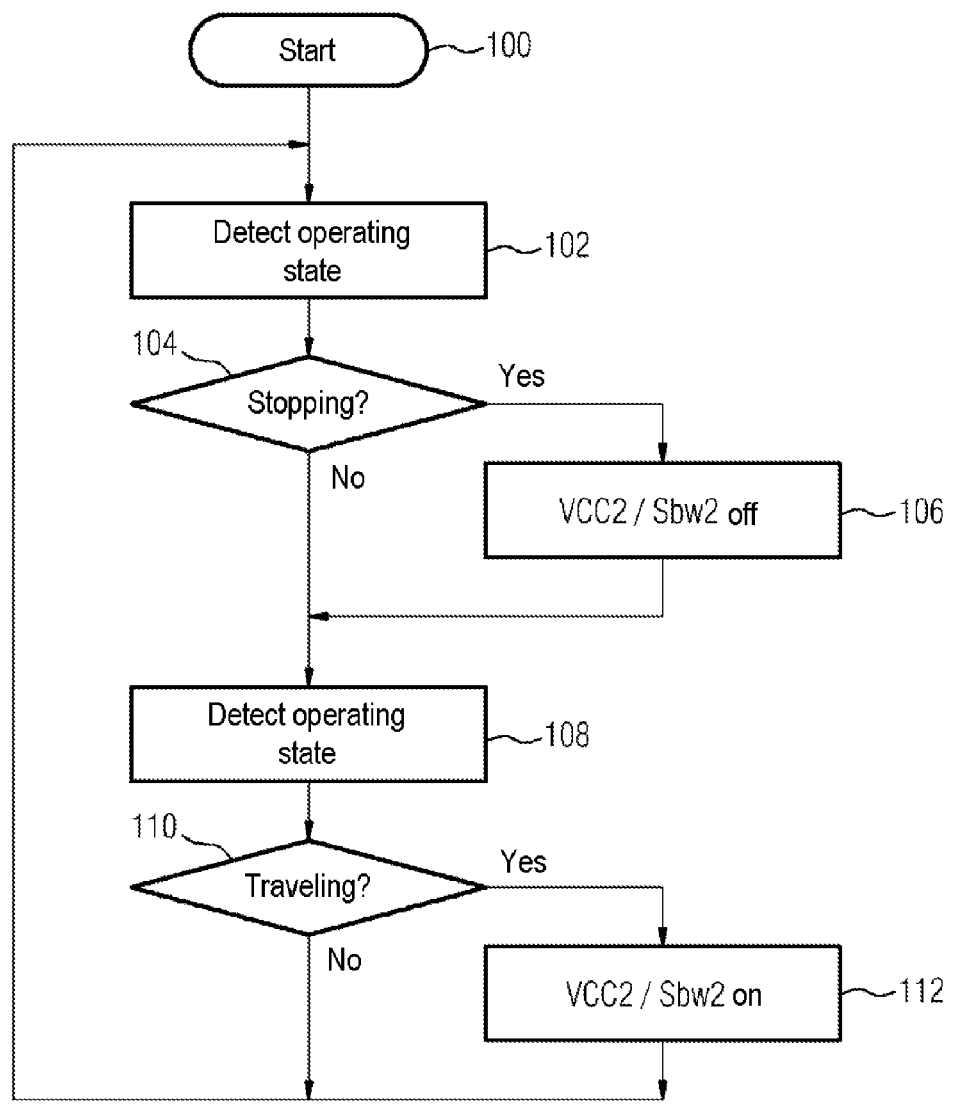
FIG. 3 shows a method for switching computers on and off.

FIG. 3 shows a method for switching computers on and off by means of which switching is executed, for example, between the switching states shown at the top by means of FIG. 2.

The method steps 102 to 106 shown in FIG. 3 are performed in the central control unit VCC2 in a first variant. Method steps 108 to 112, in contrast, are performed in the central control unit VCC1 in the first variant.

The method begins at a method step 100, also called step 100 in brief.

In a step 102, following step 100, the operating state of the vehicle is detected, for example by the second central control unit VCC2.

After step 102, step 104 is performed by the second central control unit VCC2. In step 104, it is checked whether the vehicle is in operating state Z2, i.e. stopping. If the vehicle is in operating state Z2, i.e. stopping, step 104 is followed directly by a method step 106 in which the second control unit VCC2 switches itself off If, in contrast, the vehicle is not in operating state Z2, i.e. stopping, step 104 is followed directly by a method step 108 in which the first control unit VCC1 detects the operating state.

In a method step 110 following step 108, the first control unit VCC1 checks whether state Z1, Z3, i.e. traveling, is active. If the vehicle is in operating state Z1 or Z3, respectively, i.e. traveling, step 110 is followed directly by a method step 112 in which the first control unit VCC1 switches on the second control unit VCC2.

If, in contrast, the vehicle is not in operating state Z1 or Z3, i.e. traveling, step 110 is followed directly again by method step 102.

In a second variant, the method, shown in FIG. 3, for the second steering control unit Sbw2 is performed. Method steps 102 to 106 shown in FIG. 3 are performed in the second steering control unit Sbw2 in the second variant. Method steps 108 to 112, in contrast, are performed in the first steering control unit Sbw1 in the second variant.

The method begins again at a method step 100, also called step 100 in brief

In a step 102 following step 100, the operating state of the vehicle is detected, for example by the second steering control unit Sbw2.

After the step 102, step 104 is performed by the second steering control unit Sbw2. In step 104, it is checked whether the vehicle is in operating state Z2, i.e. stopping. If the vehicle is in operating state Z2, i.e. stopping, step 104 is followed directly by a method step 106 in which the second steering control unit Sbw2 switches itself off If, in contrast, the vehicle is not in operating state Z2, i.e. stopping, step 104 is followed directly by a method step 108 in which the first steering control unit Sbw1 detects the operating state.

In a method step 110 following step 108, the first steering control unit Sbw1 checks whether state Z1, Z3, i.e. traveling, is active. If the vehicle is in operating state Z1 or Z3, respectively, i.e. traveling, step 110 is followed directly by a method step 112 in which the first steering control unit Sbw1 switches on the second steering control unit Sbw2.

If, in contrast, the vehicle is not in operating state Z1 or Z3, respectively, i.e. traveling, step 110 is followed directly again by method step 102.

In an optional additional method step which is located, for example, between the method steps 102 and 104, it is possible to check in both variants of FIG. 3 whether there is still a redundancy, i.e. whether the central control unit VCC1 or the first steering control unit Sbw1, respectively, are still fully functional. If this is so, the method is performed in such a manner as has been explained above. If, in contrast, the central control unit VCC1 or the first steering control unit Sbw1 are no longer available, the method is terminated.

The method shown in FIG. 3 is only an example. The same functions can also be achieved by other methods, for example, a method for switching the switching states can be called up only in the case of a change of the operating states so that the operating states do not need to be established continuously. Cyclic polling of the operating states can also be considered.

FIG. 4 shows process tables in which processes to be executed are noted. For example, each column corresponds to a process table, the process tables being allocated to processors Pr1 to Pr4 as follows:
column 1, i.e. first process table, to processor Pr1,
column 2, i.e. second process table, to processor Pr2,
column 3, i.e. third process table, to processor Pr3, and
column 4, i.e. fourth process table, to processor Pr4.

In the four process tables, the following lines relate to in each case:
first line: a function F1 which, in the example, relates to steering,
second line: a function F2 which, in the example, relates to holding a predetermined speed (ACC—Automatic Cruise Control),
third line: a function F3 which, in the example, relates to charging a battery,
fourth line: a function F4 which, in the example, relates to the electronic stabilizing ESP of the vehicle,
fifth line: a function F5 which, in the example, relates to engine control, particularly controlling an electric motor, and
sixth line: a function F6 which, in the example, relates to a connection to a mobile radio network, in this case to UMTS (Universal Mobile Telecommunications System) or, alternatively, to an LTE (long term evolution) network.

The crosses, shown in FIG. 4, at the intersections of lines and columns symbolize an entry in the relevant process table. If the entry exists, a process belonging to the relevant function is executed in the relevant processor. If the entry no longer exists, at a location, in contrast, no process is executed which provides the function for which the relevant line is provided.

An entry 120 relates to, for example, function F1 in processor Pr3. An entry 122 relates to, for example, function F1 in processor Pr4.

The entries shown in FIG. 4 correspond to, for example, a state in which the energy is not used efficiently because the redundancy is not selectively reduced.

By means of the method explained with reference to FIG. 5, in contrast, it is possible to reduce redundancy selectively:

In a state Z4 "traveling", already optimized with respect to energy, the following applies:

- entries for function F1 "steering" are entered in all process tables,
- entries for function F2 "ACC" (Automatic Cruise Control) are entered in all process tables when this function is active. As an alternative, only entries for processors Pr1 and Pr2 are entered when the function "ACC" is not utilized.
- The entries for function F3 are all removed because the vehicle, for example, is accelerating.
- Entries for function F4 "ESP" are entered in all four process tables. As an alternative, an entry for processor Pr1 and an entry for processor Pr2 may be sufficient in uncritical traveling situations.
- There are two entries for engine control in the columns for processor Pr1 and for processor Pr2.
- There is an entry for function F6 (UMTS) in the first column, i.e. in the column for processor Pr1.

In an operating state Z5, the vehicle stops, for example, at a traffic light. For this reason, entries 120 and 122 are removed from the second central control unit VCC2. This is permissible because during stopping, no or only uncritical steering movements can be expected and, therefore, no quadruple redundancy is required. In the first two columns, the entries for function F1 "steering" are still present, in contrast.

In operating state Z5, the entries for function F2 "ACC" can be removed in the columns for processors Pr3 and Pr4. In the first two columns, i.e. in the columns for processors Pr1 and Pr2, in contrast, the entries for function F2 "ACC" remain. Functions F4 and F5 are in each case provided by processor Pr1 and Pr2, respectively. Function F6 is provided by processor Pr1.

In an operating state Z6, the vehicle is standing and is charged up, for example, via a plug-in socket. There are now only the two entries in the third line, i.e. for charging. All other entries are deleted. Processors Pr3 and Pr4 can thus be switched off and processors Pr1 and Pr2 only need little computing power.

Figure 5:
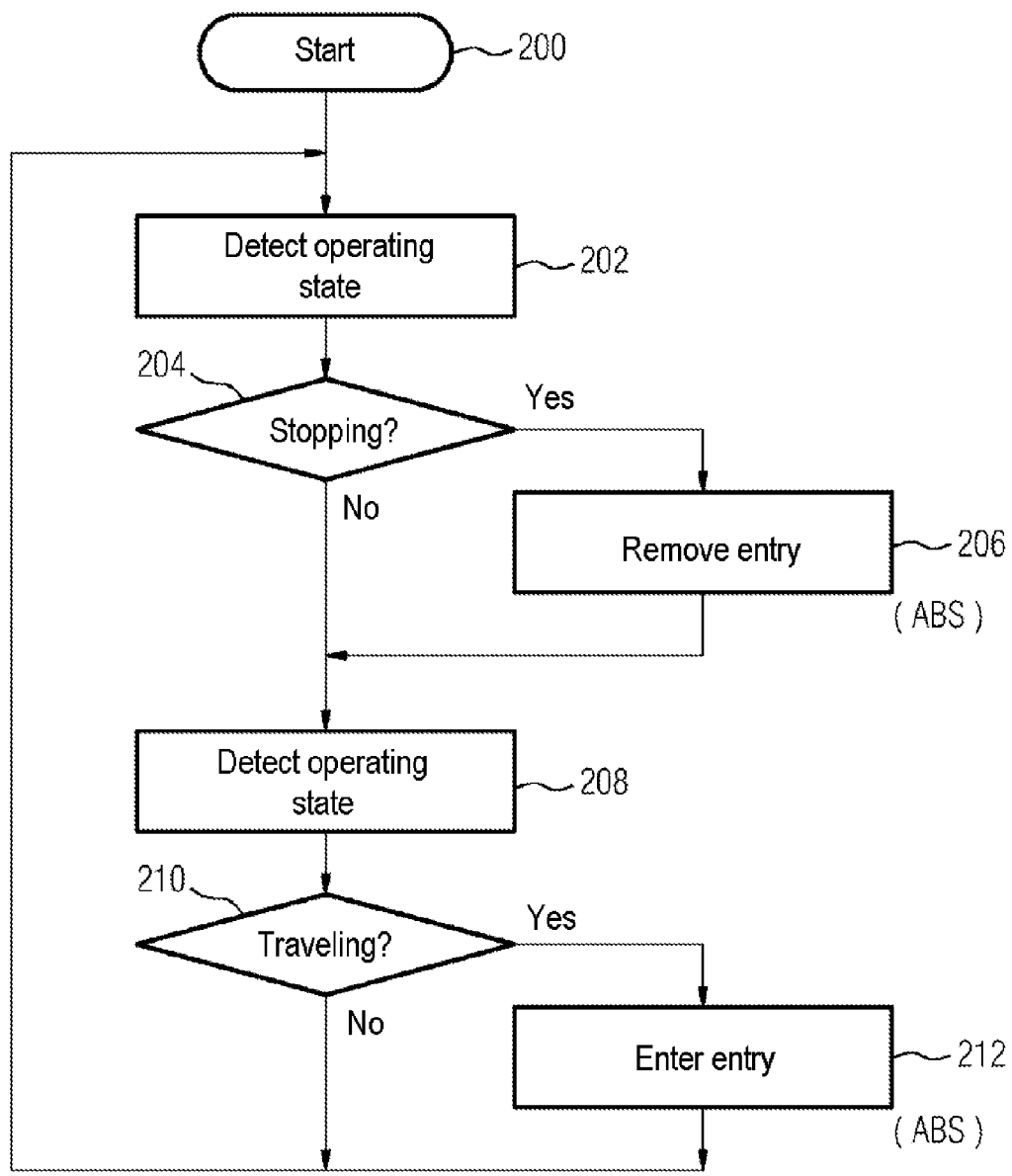
FIG. 5 shows a method for switching processes on and off.

FIG. 5 shows a method for switching processes on and off.

Method steps 200 to 212 shown in FIG. 5 are performed in the central control unit VCC2 in a first variant.

The method begins in a method step 200, also called step 200 in brief. In a step 202 following step 200, the operating state of the vehicle is detected, for example by the second central control unit VCC2.

After step 202, step 204 is performed by the second central control unit VCC2. In step 204, it is checked whether the vehicle is in operating state Z5. If the vehicle is in operating state Z5, i.e. stopping, step 204 is followed directly by a method step 206 in which the second control unit VCC2 switches off function F1 by removing entries 120 and 120 in a process table or in two process tables, respectively. Function F1 is thus no longer executed by processors Pr3 and Pr4.

If, in contrast, the vehicle is not in operating state Z5, i.e. stopping, step 204 is followed directly by a method step 208 in which the second control unit VCC2 again detects the operating state.

In a method step 210 following step 208, the second control unit VCC2 checks whether the state Z4, i.e. traveling, is active. If the vehicle is in operating state Z4, i.e. traveling, step 210 is followed directly by a method step 212 in which the second control unit VCC2 switches on function F1, for example by entering entries 120 and 122 in the two process tables, see FIG. 4.

If, in contrast, the vehicle is not in operating state Z4, i.e. traveling, step 210 is again followed directly by method step 202.

In a second variant, the method shown in FIG. 3 is performed for the second braking control unit Bbw2. In the second variant, method steps 200 to 212 are performed in the braking control unit Bbw2.

The method begins again in a method step 200, also called step 200 in brief. In a step 202 following step 200, the operating state of the vehicle is detected, for example by the second braking control unit Bbw2.

After the step 202, step 204 is performed by the second braking control unit Bbw2. In step 204, it is checked whether the vehicle is in operating state Z5. If the vehicle is in operating state Z5, i.e. stopping, step 204 is followed directly by a method step 206 in which the second braking control unit Bbw2 switches off the ABS function by removing entries in a process table or in two process tables, respectively, of the second braking control unit Bbw2. The ABS function is thus no longer executed by the two processors of the second braking control unit Bbw2.

If, in contrast, the vehicle is not in operating state Z5, i.e. stopping, step 204 is followed directly by a method step 208 in which the second braking control unit Bbw2 again detects the operating state.

In a method step 210 following step 208, the braking control unit Bbw2 checks whether state Z4, i.e. traveling, is active. If the vehicle is in operating state Z4, i.e. traveling, step 210 is followed directly by a method step 212 in which the second braking control unit Bbw2 switches on the ABS function, for example by entering the entries, previously removed, in the two process tables of the second braking control unit Bbw2.

If, in contrast, the vehicle is not in operating state Z4, i.e. traveling, step 210 is again followed directly by method step 202.

In an optional additional method step which is located, for example, between method steps 202 and 204, it is possible to check by means of the methods explained with reference to FIG. 5 whether there is still a redundancy, i.e. whether the central control unit VCC1 or the first braking control unit Bbw1, respectively, are still fully operational. If this is so, the method is performed in such a manner as has been explained above. If, in contrast, the central control unit VCC1 or the first braking control unit Bbw1, respectively, are no longer available, the method is terminated.

The method shown in FIG. 5 is only an example. The same functions can also be achieved by other methods, for example, a method for switching the switching states only in the case of a change of the operating states can be called up so that the operating states do not need to be continuously determined. Cyclic polling of the operating states can also be considered.

Figure 6:
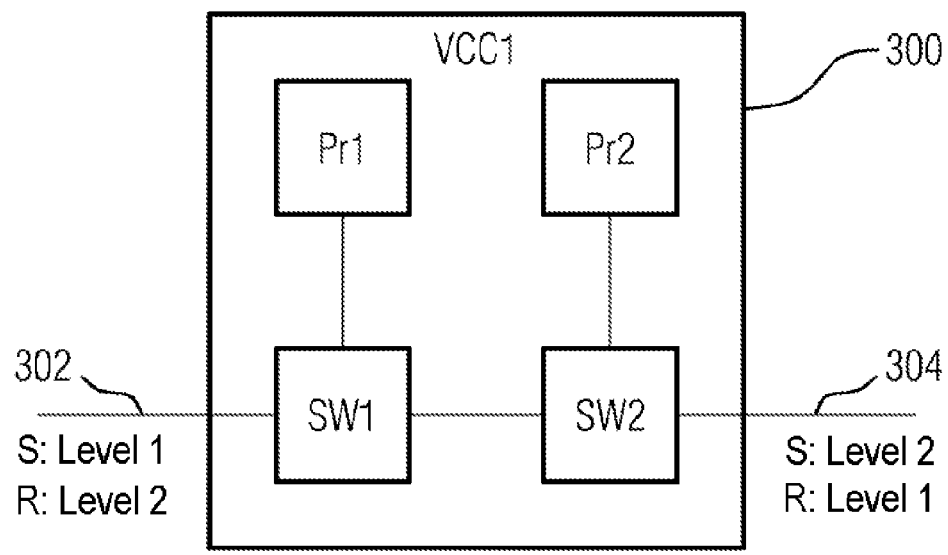
FIG. 6 shows the structure of a central data processing unit of a vehicle which is operated on an Ethernet.

FIG. 6 shows the structure of a central data processing unit 300 or VCC1, respectively, of a vehicle, the data processing unit 300 or VCC1, respectively, being operated on an Ethernet.

Apart from the abovementioned processors Pr1 and Pr2 and the associated memory units, not shown, the central control unit 300 contains:
- a first switch SW 1 which operates in accordance with Ethernet protocol, and
- a second switch SW2 which operates in accordance with Ethernet protocol.

Switch SW1 has connections to:
processor Pr1,
switch SW2, and
a network section 302.
Switch SW2 has connections to:
processor Pr2,
switch SW1, and
a network section 304.

For example, two network levels of the Ethernet are defined. With respect to network section 302, switch SW1 sends at level 1 and receives at level 2. With respect to network section 304, switch SW2 sends at level 2 and receives at level 1.

Thus, control unit 300, or VCC1, respectively, receives (R) data from the right at level 1 which it either processes itself or sends out again to the left at level 1 (S). At level 2, control unit 300, or VCC1, respectively, receives (R) data from the left which it either processes itself or sends out again to the right at level 2 (S). By means of this topology and by means of these specifications, ring topologies or other network topologies having two directions of transmission can be set up in order to provide for redundant data transmission. For example, a message must have been received first via both levels 1 and 2 before it is processed and can thus trigger control processes.

At higher protocol levels, TCT/IP is used in the exemplary embodiment. However, other network protocols can also be used instead of Ethernet or TCP/IP, respectively.

In the exemplary embodiment of FIG. 6, the data processing unit VCC2 is configured similarly to the data processing unit VCC1, i.e. apart from processors Pr3 and Pr4, it also contains two switches SW3 and SW4. Switch SW3 is connected, for example, to a network section 302*b* and switch SW4 is connected to a network section 304*b*. The two control units VCC1 and VCC2 can be connected in the following order, for example to form an inner ring:
control unit 300 or VCC1, respectively,
network section 302,
fifth Ethernet switch SW5,
network section 304*b*,
control unit VCC2,
network section 302*b*,
sixth Ethernet switch SW6,
network section 304.

In this ring topology, two directions of transmission for messages are then possible. One direction at level 1 of the network and in the opposite direction at level 2 of the network. Thus, a first redundancy exists. If a segment of the ring is not available, all units can be reached via at least one of the directions of transmission which means further redundancy.

To the switches SW5 and SW6, at least one further Ethernet ring can then be connected in which the steering control units Sbw1, Sbw2, the braking control units Bbw1 and Bbw2 and possibly further units are then connected in the same manner.

The exemplary embodiments are not true to scale and not restrictive. Deviations within the framework of technical action are possible. Although the described aspects have been illustrated and described in greater detail by the exemplary embodiment(s), the aspects are not restricted by the examples disclosed and other variations can be derived from it by the expert without departing from the ordinary and applicable scope.

The invention claimed is:

1. A method for operating at least two data processing units with high availability, in a vehicle,
   in which, a first data processing unit and a second data processing unit can each provide the same function to an extent of at least 60% or at least 90%,
   in which, the second data processing unit removes automatically at least one entry for a process to be executed from a memory unit of the second processing data unit to selectively reduce a redundant processing of a function of the vehicle, wherein an entry for a process to be executed from a memory unit of the first data processing unit to perform the function of the vehicle is still present on the first data processing unit,
   wherein the removal of the at least one entry occurs based on a detection of an operating state of the vehicle for an operation of which the first data processing unit and the second data processing unit are used;
   wherein:
   in a traveling operating state of the vehicle, the first data processing unit is switched on, the second data processing unit is switched on, a first steering control unit is switched on, and a second steering control unit is switched on,
   in a stopped operating state of the vehicle, the first data processing unit is switched on, the second data processing unit is switched off, the first steering control unit is switched on, and the second steering control unit is switched off.

2. The method as claimed in claim 1, wherein the vehicle is a transport vehicle.

3. The method as claimed in claim 2, wherein the detection of the operating state is based on a state of stopping, charging of a battery, or traveling.

4. The method as claimed in claim 1, wherein the operating state is detected with the aid of at least one sensor unit, the at least one sensor unit being at least one of a motion sensor, a speed sensor, and a tachometer.

5. The method as claimed in claim 1, wherein the first data processing unit and the second data processing unit are operated on a data transmission network using a data transmission protocol which enables processors or network units to be switched on.

6. The method as claimed in claim 5, wherein the data transmission network is an Ethernet.

7. The method as claimed in claim 1, wherein the at least one entry removed is entered again automatically by the second data processing unit, depending on a current operating state of the vehicle.

8. The method as claimed in claim 1, wherein each data processing unit of the first data processing unit and the second data processing unit contains at least two processors.

9. The method as claimed in claim 1, wherein the first data processing unit and the second data processing unit are connected in each case to two redundant data transmission links or data processing networks.

10. The method as claimed in claim 1, wherein the first data processing unit and the second data processing unit provide at least one core function for controlling the vehicle.

11. The method as claimed in claim 1, wherein the first data processing unit and the second data processing unit provide at least one function in at least one peripheral sub system of the vehicle.

12. The method as claimed in claim 1, wherein the first data processing unit is higher ranking than the second data processing unit.

13. A device for operating a vehicle comprising:
a first data processing unit; and
a second data processing unit, wherein the first data processing unit and the second data processing unit provide the same functions to an extent of at least 60 percent or to an extent of at least 90 percent; and
a control unit in the second data processing unit, wherein the control unit removes at least one entry for a process to be executed from a memory unit of the second processing data unit to selectively reduce a redundant processing of a function of the vehicle, wherein an entry for a process to be executed from a memory unit of the first data processing unit to perform the function of the vehicle is still present on the first data processing unit; and
wherein the first data processing unit is higher-ranking than the second data processing unit with respect to providing functions or with respect to the redundancy, as entered in the memory unit of the first data processing unit;
wherein the removal of the at least one entry occurs based on a detection of an operating state of the vehicle for an operation of which the first data processing unit and the second data processing unit are used;
wherein:
in a traveling operating state of the vehicle, the first data processing unit is switched on, the second data processing unit is switched on, a first steering control unit is switched on, and a second steering control unit is switched on,
in a stopped operating state of the vehicle, the first data processing unit is switched on, the second data processing unit is switched off, the first steering control unit is switched on, and the second steering control unit is switched off.

14. The device as claimed in claim 13, with a first data transmission link or a first data processing network and with a second data transmission link or a second data transmission network, at which the first data processing unit and the second data processing unit are connected,
wherein at least 60 percent of the data to be transmitted or at least 90 percent of the data to be transmitted are transmitted via both data transmission links or via both data transmission networks.

15. The device as claimed in claim 13, wherein the operating state is detected with the aid of at least one sensor unit, the at least one sensor unit being at least one of a motion sensor, a speed sensor, and a tachometer.

* * * * *